Patented Dec. 14, 1937

2,102,114

UNITED STATES PATENT OFFICE 2,102,114

LACQUERS OF THE UREA RESIN TYPE

Carleton Ellis, Montclair, N. J., assignor to Ellis-Foster Company, a corporation of New Jersey No Drawing. Application June 9, 1930, Serial No. 460,110

15 Claims. (Cl. 134—26)

This invention relates to lacquer compositions or analogous coating compositions prepared from urea formaldehyde material or other condensation products of a related character, including derivatives of urea such as thiourea, and the like, and mixtures of urea with one or more of such derivatives or mixtures of the derivatives themselves incorporated in a solvent material, preferably of a volatile character such as organic solvents of the alcohol and ketone type and others, as will be more fully set forth in the following.

The subject matter of the present application is derived from certain copending applications, such as Serial No. 689,165, filed January 28, 1924. In that prior application, Serial No. 689,165, the claims are directed to the urea-formaldehyde type condensation products and methods of producing the same, whereas the instant case is concerned with compositions of matter containing such condensation products. In that application, Serial No. 689,165 condensation products are made from urea and formaldehyde, paraform or other aldehydic material sometimes in the presence of a catalytic body such as an acid substance, and these condensation products are dissolved in a solvent such as methyl or ethyl alcohol or preferably a ketone such as acetone. Among the acids disclosed in that prior application which may be employed in producing compositions containing such condensation products the following may be mentioned: inorganic acids, such as hydrochloric and phosphoric; inorganic acid salts, such as bisulphates and aluminum chloride; and organic acids and their anhydrides, including oxalic, lactic, succinic, tartaric, acetic, citric, malic, acetic anhydride, propionic acid, maleic, mucic, trichloracetic, and other acids in the aliphatic series, and benzoic, salicylic, acetyl salicylic, phthalic, gallic, and the like, in the aromatic series.

When urea, phthalic anhydride and aqueous formaldehyde are mixed and heated in an open flask a milky liquid at first appears but on continued heating, preferably by boiling, the solution gradually clarifies and a thin transparent syrup is formed which on cooling becomes heavy bodied. Fifteen minutes to one hour boiling usually suffices to bring about this conversion. The heavy bodied syrup thus obtained will on long standing sometimes, for example in a few days' time, show some separation of a whitish solid substance.

The syrup obtained in this way has the curious property of being soluble in or miscible with organic solvents such as methyl or ethyl alcohol or better with a ketone such as acetone. This solubility or miscibility has certain limits as too great an addition of, for example, acetone will give a white precipitate. Also, if diluted with water a white precipitate will form in some cases when a certain dilution is reached.

For ordinary purposes the syrup may be diluted with an equal volume of acetone. This provides a solution which may be used as a varnish or impregnating medium. A coating of this material slowly hardens on exposure to air and much quicker on baking. Thus the solution may be applied to metal surfaces and the articles baked in order to produce a hard transparent coating.

Another mixture is made by boiling together 15 parts of urea, 15 parts of phthalic anhydride and 60 parts of ordinary aqueous formaldehyde of 37 to 40 per cent strength. The mixture may be boiled in an open flask for 12 to 15 minutes or longer if necessary to bring about clarification. The use of a reflux condenser is not always desirable because it may tend to cause the syrup to deposit a heavier precipitate of white material on standing. However, suitable arrangements may be made such as an ordinary condenser (not refluxing) to collect any distillate and recover formaldehyde. In some cases the heating may be carried out in an autoclave under pressures above atmospheric.

Aqueous solutions generally tend to thicken and set to a solid pasty mass in the course of time. When thinned with acetone, however, the solutions show a much greater permanency which is desirable for many applications.

Acetone will mix in the cold with a syrup such as is obtained according to the above example. Alcohol, however, does not mix as well and it is better to add this solvent to the freshly prepared warm syrup. In this way a solution is obtained which on cooling does not show separation at least for some time.

The phthalic-urea complex made in this way when not baked or exposed to any high degree of heat is soluble in furfural. It is also soluble in phenol. The latter will dissolve even the baked material in many cases. A solution of the well-dried resinous complex may be dissolved in furfural and a solution of nitrocellulose and acetone admixed with it to give a clear product.

Among the uses for the product of the present invention is in the varnish, lacquer, paint and enamel industry, as an impregnating material, for hat stiffening and as a cement.

The material of the present invention may be mixed with other substances such as resins, nitrocellulose, or other cellulose esters or ethers, with shellac solutions, either aqueous or alkaline, and the like.

When the urea condensation product is to be mixed with resins such as acetone resin, and the like, this advantage of solubility in organic solvents is of particular value. Further reference to complexes or mixtures of urea condensation material and other resins will be made later.

The employment of dimethylol urea or monomethylol urea, or mixtures of mono- and dimethylol ureas and/or substituted methylol ureas, is included. Somewhat similar subject matter is discussed with especial reference to the production of laminated glass. Although highly volatile solvents such as the lower alcohols and ketones have been especially mentioned in the foregoing, the employment of heavier solvents such as furfural is highly desirable when a composition having slower qualities of evaporation is desired and which therefore may be applied to a surface with a brush without the formation of permanent brush marks.

Thus it will be noted that I propose a solution of the well dried resinous complex dissolved in furfural and admixed with a solution of nitrocellulose dissolved in acetone. A clear lacquer is obtained. Still heavier solvents may be used, including glycerol and various glycols such as ethylene and propylene glycols, or mixtures of glycerol and glycol, the proportion of such heavy solvent being such that the composition will range from thick viscous syrups to more consistent products. These heavier solvents when sufficiently non-volatile may also function as plasticizing agents, either temporarily or permanently according to requirements.

Thus the urea formaldehyde resinous material derived by the condensation of urea and formaldehyde solution may be placed in solution in a variety of organic solvents, some of which for example are free or substantially free from water and allow the volatile solvent to dry out without leaving a residue of water. Again, a solvent of a heavier character such as furfural or other liquid aldehydes, alcohols, and the like, which are appropriate solvents, may be employed to produce less volatile coating compositions which are excellent for employment as brushing lacquers. Those in which the solvents are of a non-volatile character are usually best adapted to be applied by spraying. Likewise, solvents of the nature of glycol, including derivatives thereof such as propylene glycol, may be used when still heavier solvents are required or especial softening or plasticizing effects are needed. When a polyhydric alcohol or its derivative is employed it may be used in various proportions as, for example, when glycerol is used 5 to 6 parts of the urea resin to 1 part of glycerol may be utilized to yield on drying a firm, transparent, slightly flexible product. A flexible film may be obtained by incorporating 2 or 3 parts of the urea resin with 1 part of glycerol. A soft sticky product results by using approximately equal weights. In some cases, as has been noted, acetone or other volatile organic solvent may be used as a thinning agent. The incorporation of other synthetic resins light in color, such as white acetone resin or vinyl acetone resin (methylene ketone resin) with urea resin may be carried out if desired. A white transparent flexible and soft acetone resin made by the reaction of paraform with acetone in the presence of trisodium phosphate when incorporated with urea resin exerts a softening effect thereon to a considerable extent and may be used in the production of suitable lacquers.

The composition may be applied to a surface and allowed to air-dry if desired or may be baked at a temperature high enough to secure reasonably rapid hardening, but not at a temperature which is conducive to the formation of bubbles. Thus a baking temperature of 65–75° is preferable, although higher or lower temperatures may be used in some cases. The employment of urea or mixtures of urea and thiourea reacted with an aldehyde, preferably formaldehyde is included, although other aldehydes may be used with or without other resins. Reaction products of urea formaldehyde and a phenol likewise may be employed in some cases for coating purposes.

A crude coal tar xylenol product boiling between 200° and 220° C. was distilled and the fraction distilling over approximately between 212° and 220° C. was used in the present instance. 120 parts by weight of this fraction, 60 parts of urea, 275 parts of aqueous formaldehyde of approximately 40 per cent strength and 5 parts of phthalic anhydride were placed in a vessel provided with a reflux air condenser. On applying heat, reaction began in a few minutes, when the source of heat was removed. The reaction thenceforth proceeded spontaneously with bubbling and the evolution of heat. After a period of between 20 and 30 minutes bubbling ceased. Fumes which previously were escaping through the air condenser were no longer in evidence. When this point was reached cold water was added, causing precipitation of the white opaque urea product. It was dried in a vacuum dryer up to about 70° C. yielding a white spongy solid. The wet product contained 5.1 per cent of water. The dried product amounted to 52.5 per cent of the total material taken or about 82 per cent of the anhydrous reagents.

When tested for melting point (using the ordinary capillary tube means of determination) a fragment of the opaque product became transparent between 91° and 93° C. On raising the temperature, opaqueness appeared again at 112° C. The acid number with this proportion of phthalic anhydride was found to be 20.6.

The dry resin was found to be practically insoluble in water, acetone, ether, turpentine, petroleum ether, ethyl acetate, amyl acetate, diethylphthalate, diethylcarbonate and linseed oil. It was very slightly soluble in methyl, ethyl and isopropyl alcohols, benzol and toluol.

It was fairly soluble in butyl alcohol, soluble in benzyl alcohol, cyclohexanol and furfural. Mixed solvents are much more effective than single solvents. For example, although practically insoluble in benzol and ethyl alcohol separately, solution occurs readily, with very slight residue, in a mixture of 1 part alcohol and 2 parts benzol. The product also is soluble in butyl alcohol-benzol; methyl alcohol-benzol; methylethyl ketone-benzyl alcohol; xylol-alcohol; alcohol-camphor-benzol; butyl acetate-ethyl alcohol-benzyl alcohol; cyclohexanol-alcohol; isopropyl alcohol-benzol.

These composite solvents are more effective hot than cold. On cooling, a slight deposit occurs, which may be filtered off or decanted. The addition of benzyl alcohol to any mixture which was cloudy clarified it readily.

The urea product such as that typified by the above example may be used to blend with nitrocellulose or other cellulose esters or ethers. Incorporated with soluble cotton in appropriate solvents a lacquer is obtained which is very hard and is light stable. Pigments may be added or ground in the solution to make an enamel or paint. Heat-treated nitrocellulose of low viscosity ("low-plasticity") or nitro cotton which has been chemically treated to reduce viscosity may be used to advantage. Gelatinated nitro cotton, celluloid, celluloid scrap, film scrap, etc., also are available.

The following lacquer solutions were prepared:—

(1) Equal parts by volume of a 20 per cent solution of the urea product in benzol-ethyl alcohol (2:1), and a 20 per cent solution of alcohol-soluble nitrocellulose dissolved in anhydrous ethyl alcohol, containing a few per cent of ethyl acetate.

(2) 3 parts of a 20 per cent solution of the urea product in a mixture of cyclohexanol and benzol to 1 part of a 20 per cent solution of nitrocellulose as above described.

(3) 2 parts of a 20 per cent solution of the urea product in benzyl alcohol to 1 part nitrocellulose solution as above described.

Lacquer solution (1) was clear, while (2) and (3) were slightly cloudy. When applied to a glass plate and dried at 50° C. all these coating compositions yielded hard transparent films.

It may be noted that the solution of good quality urea product in a colorless solvent yields a very light colored solution which in most cases is lighter in color than nitrocellulose solutions.

In another case the urea product was dissolved in a mixture of butyl alcohol and xylol and to the cloudy solution benzyl alcohol was added until a clear solution was obtained. A small amount of butyl acetate was added and nitro cotton (low viscosity soluble cotton) dissolved in the mixture. Finally castor oil was added as a softener. A solution of urea product in benzyl alcohol, xylol and butyl acetate readily dissolved soluble cotton, yielding a clear solution. Castor oil was added in small quantity as a softening agent.

Examples of other lacquers made from urea condensation products are the following:

A mixture of urea and formaldehyde (formalin pH 7) in the proportion to form a mixture of equal parts by weight of mono- and dimethylol urea are allowed to react together at room temperature for a period of 36 hours. In this way a white composition of paste-like consistency is obtained. The paste is dissolved in 20 per cent of its weight of aqueous formaldehyde (formalin of strength 37.5 per cent formaldehyde, pH 7) and the solution boiled until a highly viscous material is secured, this evaporation involving a loss in weight of 45 per cent. Ammonium thiocyanate equivalent in amount to from 1 to 5 per cent of the solids of this viscous material is dissolved in anhydrous methyl alcohol and the solution is heated to the boiling point. The hot highly viscous urea formaldehyde condensation product is poured into the alcoholic solution, which clouds immediately. This mixture is then heated under a reflux condenser, whereupon the cloudiness disappears and a slightly reddish colored but otherwise clear liquid is obtained. On heating for a period of 10 minutes, or more, under the reflux condenser the reddish color disappears and a light colored clear liquid results which is suitable for use as a coating composition. If the ammonium thiocyanate is not present in the alcohol the result is a very cloudy solution. The ammonium thiocyanate serves to regulate to some extent the rate of hardening or curing of the resin after the coating has been applied to a surface and the alcohol allowed to evaporate.

If sheet-like material is desired, the composition may be applied to glass or similar surfaces and after hardening the film stripped therefrom. The application of a film of oil to the glass may be employed to assist in stripping. The introduction of a small amount of glycerol or glycol to the coating composition assists in the stripping.

The term "urea resin" or "resin of the urea type" used herein embraces resins and plastic materials of this general character useful for the purposes herein specified and comprises those products arising from urea and/or its derivatives, isomers, polymers, congeners and bodies capable of forming urea and the like, including thiourea, thiocarbanilide, dicyandiamide, guanidine, cyanamide, ammonium, thiocyanate, biuret, and others.

Using an aldehyde such as formaldehyde, I prefer to react in proportions adequate to form a mixture of (or the equivalent of) mono- and dimethylol urea, especially a mixture in the proportions of approximately equal parts or equal mols. Using formaldehyde in a proportion below that required to convert urea completely to the dimethylol compound there is less likelihood of an odor of formaldehyde from the coating than when higher proportions thereof are used. When the proportion of formaldehyde to urea is in the neighborhood of that represented by equal mols of mono- and d:methylol urea there is no objectionable odor of formaldehyde emanating from the coating or impregnum. Solutions of such products, therefore, may be used to coat or impregnate paper used for purposes where the odor arising from urea formaldehyde condensation products made with the higher ratio of formaldehyde would be extremely objectionable.

A solution (a part at least of the solvent media of which is an organic solvent) containing the condensation product of the urea type of a character which does not give off an objectionable odor of formaldehyde hence can be used in an advantageous manner in many different directions. The invention therefore embraces a paint, varnish or lacquer or other coating composition containing a resin, plastic or condensation product of the urea type which does not evolve, on drying, an objectionable aldehydic odor.

When ammonium thiocyanate is employed, especially in neutral solution to assist in clarification, a red coloration is likely to result if the solution comes in contact with iron. In that case it is advisable after clarification to discharge any objectionable discoloration by the addition of a very small amount of oxalic or tartaric acid and the like.

When incorporated with nitrocellulose the urea formaldehyde resin or plastic has the advantage of hardening the nitrocellulose coating or film. In this way a hardened surface or film may be obtained, the hardening effect depending upon the amount of the urea resin introduced. Another advantage in the use of the urea resin is the reduction in inflammability. By the addition of a substantial proportion of the urea resin to nitrocellulose the inflammability is materially reduced.

In some cases films of nitrocellulose may be dipped in a solution of the urea resin to form on one or both sides of the nitrocellulose sheet a coating of the resin, thereby giving a hardened surface. Such a coating is very adherent to nitrocellulose. A film of nitrocellulose ordinarily burning with great rapidity when ignited no longer burns rapidly and in fact a flame once started frequently dies out due to the retarding effect of the urea resin on combustion.

Solutions of urea resin in organic solvents which are also solvents for nitrocellulose enable plastic mixtures to be obtained by kneading, for example, a celluloid grade of nitrocellulose with camphor and the urea resin material. The composition thus obtained may be processed to secure molded articles resembling celluloid but usually harder and less inflammable.

Still another utilization of the solutions involves the impregnation of tissue, glassine or other paper to increase the transparency and create grease-resistance. Papers so impregnated may be hot calendered in order to secure a glossy surface and increase the transparency.

What I claim is:

1. A soluble resin of the urea type carried in a vehicle comprising a substantial proportion of an organic solvent.

2. A soluble resin of the urea type carried in a vehicle comprising a substantial proportion of an organic solvent, including a solvent of a volatile character.

3. A coating composition according to claim 2 containing a heavy organic solvent.

4. A composition according to claim 1 in which a part at least of the solvent media is a glycol derivative.

5. A composition according to claim 1 in which a part at least of the solvent media is a polyhydric alcohol.

6. A composition as set forth in claim 1 including a plasticizer for the urea type resin.

7. A coating composition containing a soluble urea formaldehyde type condensation product of not more than two mols of formaldehyde and one mol. of urea, and a volatile organic solvent vehicle in proportions to yield a smooth adherent coating on articles of manufacture.

8. A coating composition containing a soluble urea formaldehyde type condensation product of urea and formaldehyde in proportions corresponding with a mixture of equal parts by weight of mono and dimethylol urea, and a volatile organic solvent vehicle in proportions to yield a smooth adherent coating on articles of manufacture.

9. A coating composition containing a soluble urea formaldehyde condensation product in solution in a composite organic vehicle containing a low boiling component and a high boiling component in proportions to yield a smooth adherent coating on an article of manufacture.

10. A coating composition containing a soluble urea formaldehyde type condensation product in solution in a composite organic vehicle containing a low boiling component and a high boiling component including a polyhydric alcohol having plasticizing properties for the condensation product, the components being present in proportions to yield a smooth flexibilized adherent coating on articles of manufacture.

11. A coating composition containing a soluble urea thiourea formaldehyde type condensation product and a volatile organic solvent vehicle in proportions to yield a smooth adherent coating on articles of manufacture.

12. A coating composition containing a soluble formaldehyde condensation product of urea and another carbamid derivative, in solution in a volatile organic solvent in proportions to yield a smooth adherent coating on articles of manufacture.

13. A coating composition containing an aqueous solution of a urea-formaldehyde condensation product and a volatile organic solvent vehicle substantially free from water in proportions to yield on drying a coating substantially free from water.

14. A composition comprising a solution of a soluble urea-formaldehyde condensation product in a non-aqueous organic solvent.

15. A composition comprising a solution of a soluble urea-formaldehyde condensation product in a non-aqueous organic solvent, said solution containing a tempering agent.

CARLETON ELLIS.